(12) United States Patent
Yang et al.

(10) Patent No.: US 12,534,023 B2
(45) Date of Patent: Jan. 27, 2026

(54) ADJUSTABLE CONSOLE ASSEMBLY AND VEHICLE PROVIDED WITH THE SAME

(71) Applicants: Hyundai Motor Company, Seoul (KR); Kia Corporation, Seoul (KR)

(72) Inventors: Junnan Yang, Yantai (CN); Won Young Bae, Seoul (KR); Chunlei Sang, Yantai (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 474 days.

(21) Appl. No.: 18/082,460

(22) Filed: Dec. 15, 2022

(65) Prior Publication Data

US 2023/0294611 A1  Sep. 21, 2023

(30) Foreign Application Priority Data

Mar. 16, 2022 (CN) .......................... 202210259748.8

(51) Int. Cl.
  *B60R 7/04*  (2006.01)
(52) U.S. Cl.
  CPC ....................... *B60R 7/04* (2013.01)
(58) Field of Classification Search
  CPC ........ B60N 2/767; B60N 2/773; B60N 2/793; B60N 2/763
  USPC ................................................ 296/37.1, 37.8
  See application file for complete search history.

(56) References Cited

U.S. PATENT DOCUMENTS

| | | | | |
|---|---|---|---|---|
| 6,824,185 B2 * | 11/2004 | Tiesler | .................... | B60R 11/02 296/214 |
| 6,932,402 B2 * | 8/2005 | Niwa | ........................ | B60R 7/04 296/37.8 |
| 7,011,273 B1 * | 3/2006 | Stanford | ................ | B60N 3/102 244/1 R |
| 7,416,235 B2 * | 8/2008 | Rajappa | .................... | B60R 7/04 296/37.8 |

(Continued)

FOREIGN PATENT DOCUMENTS

| | | |
|---|---|---|
| JP | 4201608 B2 | 12/2008 |
| JP | 6413923 B2 | 10/2018 |
| KR | 10-0784295 B1 | 12/2007 |

*Primary Examiner* — Amy R Weisberg
*Assistant Examiner* — Veronica M Condo
(74) *Attorney, Agent, or Firm* — MORGAN, LEWIS & BOCKIUS LLP

(57) ABSTRACT

An adjustable console assembly and a vehicle provided with the same includes: a console lower member fixed to a vehicle and including a receiving portion provided therein; a console intermediate member slidably mounted to the receiving portion to move up or move down along the receiving portion of the console lower member; and a console upper member horizontally slidably mounted on an upper portion of the console intermediate member, wherein the console lower member, the console intermediate member, and the console upper member jointly form an overall appearance of the adjustable console assembly. The console intermediate member of the adjustable console assembly is configured for moving up or moving down, so that a height of the console assembly is adjustable, and the console upper member is horizontally slidably mounted on the upper portion of the console intermediate member, so that a length of the console assembly is adjustable.

14 Claims, 13 Drawing Sheets

(56) References Cited

U.S. PATENT DOCUMENTS

| | | | | |
|---|---|---|---|---|
| 7,434,859 B2* | 10/2008 | Mulvihill | ............... | B60R 7/04 |
| | | | | 224/400 |
| 8,100,454 B2* | 1/2012 | D'Alessandro | ........... | B60R 7/04 |
| | | | | 296/37.8 |
| 8,113,564 B2* | 2/2012 | Carnevali | .............. | B60K 35/60 |
| | | | | 296/24.34 |
| 8,196,985 B2* | 6/2012 | Penner | ..................... | B60R 7/04 |
| | | | | 296/24.34 |
| 8,556,320 B2* | 10/2013 | Yamagishi | ................ | B60R 7/04 |
| | | | | 296/37.8 |
| 8,714,613 B1* | 5/2014 | Gillis | ...................... | B60R 7/04 |
| | | | | 296/24.34 |
| 9,156,407 B1* | 10/2015 | Kramer | .................... | B60R 7/04 |
| 9,975,493 B2* | 5/2018 | Okinaga | .................. | B60R 7/04 |
| 10,029,619 B2* | 7/2018 | Sahs | ........................ | B60R 7/04 |
| 2008/0007079 A1* | 1/2008 | Sturt | ........................ | B60R 7/04 |
| | | | | 296/24.34 |

\* cited by examiner

ADJUSTABLE CONSOLE ASSEMBLY AND VEHICLE PROVIDED WITH THE SAME

CROSS-REFERENCE TO RELATED APPLICATION

The present application claims priority to and the benefit of Chinese Patent Application No. 202210259748.8 filed in the Chinese National Intellectual Property Administration on Mar. 16, 2022, the entire contents of which is incorporated herein for all purposes by this reference.

BACKGROUND OF THE PRESENT DISCLOSURE

Field of the Present Disclosure

The present disclosure relates to a vehicle field, and more particularly, to an adjustable console assembly and a vehicle provided with the same.

Description of Related Art

The console of the vehicle in the related art is difficult to satisfy everyone's needs because it is not possible to adjust a height of the console and it is impossible to expand and contract back and forth.

Also, because the console itself does not change a lot, the console lacks functions and features.

Therefore, the console in the related art needs further improvement.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an adjustable console assembly configured for adjusting a height and a length of the console assembly, and a vehicle provided with the same.

Various aspects of the present disclosure are directed to providing an adjustable console assembly. The adjustable console assembly includes: a console lower member fixed to a vehicle and including a receiving portion provided therein; a console intermediate member slidably mounted to the receiving portion to move up or move down along the receiving portion of the console lower member; and a console upper member horizontally slidably mounted on an upper portion of the console intermediate member, wherein the console lower member, the console intermediate member, and the console upper member jointly form an overall appearance of the adjustable console assembly.

A first inclined surface may be provided in the receiving portion, and a second inclined surface corresponding to the first inclined surface may be provided in the console intermediate member, a first sliding groove may be provided on one of the first inclined surface and the second inclined surface, and a first sliding rail may be provided on the other of the first inclined surface and the second inclined surface, and the first sliding rail may be mounted to be slidable along the first sliding groove, and the second inclined surface may be slidable with respect to the first inclined surface to move up or move down the console intermediate member.

The first sliding groove includes a first catching groove and a first open groove communicating with each other, the first open groove is closer to the first sliding rail than the first catching groove, a width of a portion of the first open groove close to the first catching groove decreases in a direction closer to the first catching groove, and a width of a portion of the first catching groove close to the first open groove decreases in a direction closer to the first open groove, and the first sliding rail includes a first sliding rail body and a first catching connection portion connected to each other, the first catching connection portion is closer to the first sliding groove than the first sliding rail body, a portion of the first sliding rail body close to the first catching connection portion matches a cross-sectional shape of the first open groove, the first catching connection portion matches a cross-sectional shape of the first catching groove, and the first catching connection portion is disposed in the first catching groove.

A first boss is provided on one of the first inclined surface and the second inclined surface, the first sliding groove is provided on the first boss, a first concave groove corresponding to the first boss is provided on another of the first inclined surface and the second inclined surface, and the first sliding rail is provided on the first concave groove, so that the first sliding rail of the first concave groove is slidable along the first sliding groove of the first boss.

A width of the first concave groove is greater than a width of the first boss so that the first concave groove is slidable along the first boss and the first concave groove does not come into contact with the first boss.

Two sets of first sliding grooves are provided, and correspondingly, two first sliding rails are provided.

A second sliding groove is provided on one of a lower portion of the console upper member and the upper portion of the console intermediate member, a second sliding rail is provided on another of the lower portion of the console upper member and the upper portion of the console intermediate member, and the second sliding rail is slidably mounted along the second sliding groove, so that the lower portion of the console upper member is slidable with respect to the upper portion of the console intermediate member.

The second sliding groove includes a second catching groove and a second open groove communicating with each other, the second open groove is closer to the second sliding rail than the second catching groove, a width of a portion of the second open groove close to the second catching groove decreases in a direction closer to the second catching groove, a width of a portion of the second catching groove close to the second open groove decreases in a direction closer to the second open groove, and the second sliding rail includes a second sliding rail body and a second catching connection portion connected to each other, the second catching connection portion is closer to the second sliding groove than the second sliding rail body, a portion of the second sliding rail body close to the second catching connection portion matches a cross-sectional shape of the second open groove, the second catching connection portion matches a cross-sectional shape of the second catching groove, and the second catching connection portion is disposed in the second catching groove.

A second boss is provided on one of the lower portion of the console upper member and the upper portion of the console intermediate member, the second sliding groove is provided on the second boss, a second concave groove corresponding to the second boss is provided on another of the lower portion of the console upper member and the upper portion of the console intermediate member, and the second sliding rail is provided on the second concave groove, so that the second sliding rail of the second concave groove is slidable along the second sliding groove of the second boss.

A width of the second concave groove is greater than a width of the second boss so that the second concave groove is slidable along the second boss, and the second concave groove does not come into contact with the second boss.

Two sets of second sliding grooves are provided, and correspondingly, two second sliding rails are provided.

A driving device is provided in the console lower member, and an output shaft parallel to the first inclined surface is provided in the driving device; a connecting member extending toward the second inclined surface is provided on the output shaft, and an extension groove disposed in a longitudinal direction of the first inclined surface is provided on the first inclined surface, a connecting groove corresponding to the connecting member is provided on the second inclined surface, and the connecting member of the output shaft is inserted into the connecting groove of the console intermediate member, the output shaft of the driving device expands or contracts along the extension groove of the first inclined surface, so that the connecting member is moved along the extension groove of the first inclined surface to move the console intermediate member along the first inclined surface and fixes the console intermediate member at a predetermined position on the first inclined surface.

Various aspects of the present disclosure are directed to providing a vehicle provided with the adjustable console assembly of the exemplary embodiment of the present disclosure.

According to an exemplary embodiment of the present disclosure, the console intermediate member of the adjustable console assembly is configured for moving up or moving downwards, so that the height of the console assembly is adjustable, and the console upper member is horizontally slidably mounted on the upper portion of the console intermediate member, so that the length of the console assembly is adjustable.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
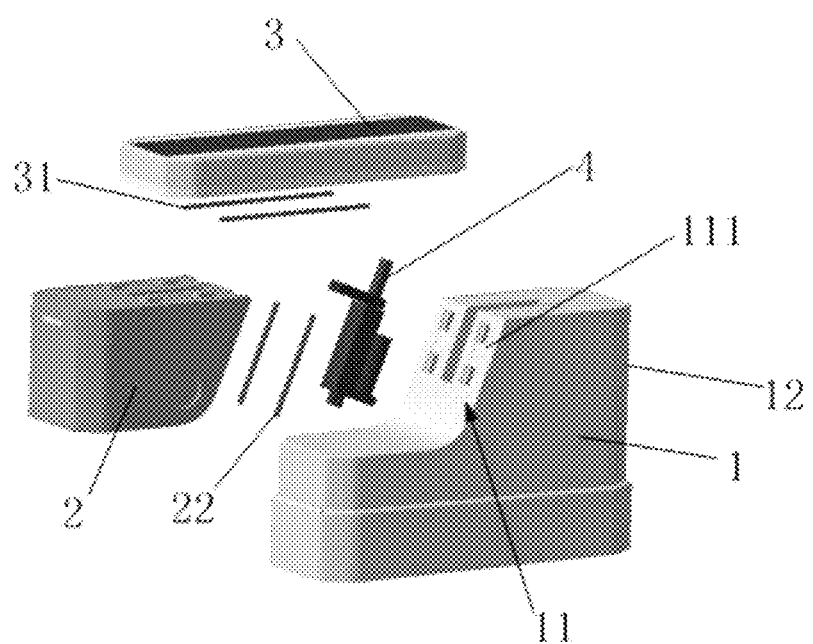
FIG. 1 is an exploded perspective view of an adjustable console assembly according to various exemplary embodiments of the present disclosure.

It should be understood that the drawings simply illustrate features in order to explain the basic principles of the present disclosure, and are not necessarily drawn to scale. Specific design features disclosed in an exemplary embodiment of the present disclosure (including, for example, specific sizes, directions, positions, and shapes) are specifically determined in part according to applications and environments in which an exemplary embodiment of the present disclosure will be used.

In these drawings, the same reference numbers throughout the plurality of drawings indicate the same or equivalent parts of the present disclosure.

DETAILED DESCRIPTION

Hereinafter, various exemplary embodiments of the present disclosure will be referred to in detail and will be described later by exemplifying these embodiments in the drawings. While the present disclosure has been described in conjunction with exemplary embodiments of the present disclosure, it is to be understood that the present specification is not intended to limit the present disclosure to the exemplary embodiments of the present disclosure. To the contrary, the present disclosure not only includes these exemplary embodiments of the present disclosure, but also includes various alternatives, modifications, equivalents, and other implementations within the spirit of the present disclosure and the scope defined by the appended claims.

Hereinafter, an adjustable console assembly according to various exemplary embodiments of the present disclosure will be described with reference to FIGS. 1 to 13.

Figure 12:
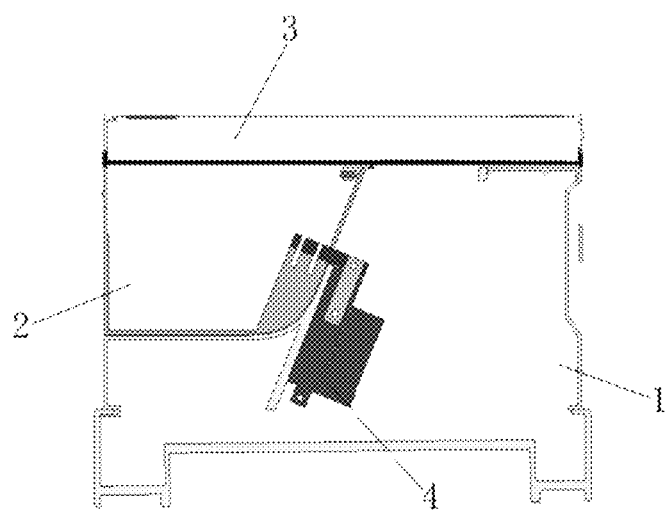
FIG. 12 is one schematic diagram illustrating use state of an adjustable console assembly.
Figure 13:
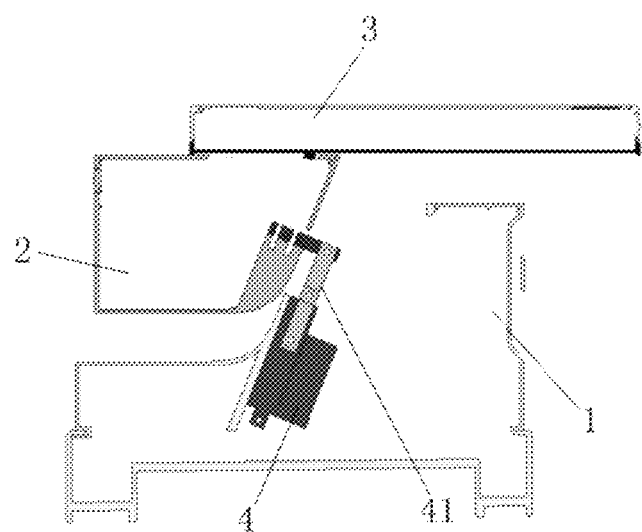
FIG. 13 is another schematic diagram illustrating use state of an adjustable console assembly.

As illustrated in FIGS. 1, 12, and 13, an adjustable console assembly according to various exemplary embodiments of the present disclosure includes a console lower member 1, a console intermediate member 2, and a console upper member 3. The console lower member 1 is mounted on a vehicle, for example, a vehicle floor panel, and is formed of a receiving portion 11. The console intermediate member 2 is slidably mounted to the receiving portion 11 so that the console intermediate member 2 can move up or move down, and the console upper member 3 is horizontally slidably mounted on an upper portion of the console intermediate member 2. The console lower member 1, the console intermediate member 2, and the console upper member 3 jointly form an overall appearance of the adjustable console assembly.

In the exemplary embodiment of the present disclosure, the console intermediate member 2 is configured for moving up or moving down so that a height of the console assembly may be adjusted, and the console upper member 3 is horizontally slidably mounted on the upper portion of the console intermediate member 2 so that a length of the console assembly is adjustable.

In the exemplary embodiment of the present disclosure, as illustrated in FIGS. 1 to 6, the receiving portion 11 is formed of a first inclined surface 111, and the console intermediate member 2 is formed of a second inclined surface 21 corresponding to the first inclined surface 111.

Figure 2:
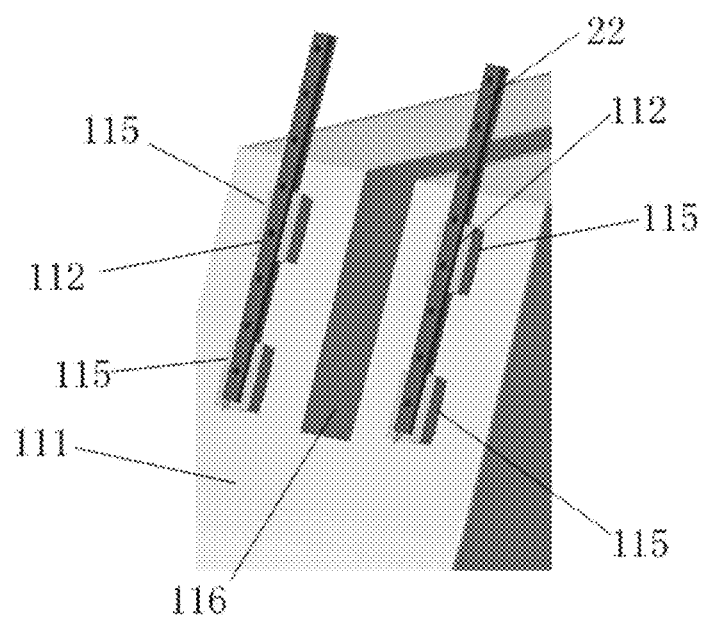
FIG. 2 is a schematic view exemplarily illustrating coupling of a first inclined surface and a first sliding rail.
Figure 3:
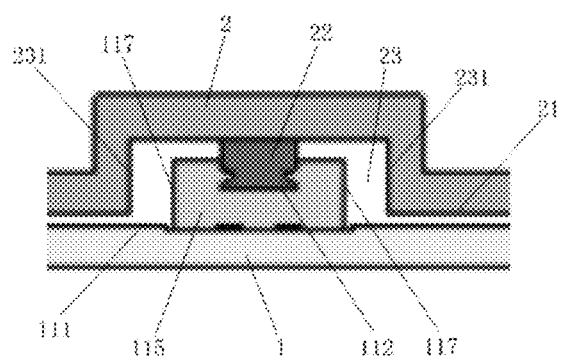
FIG. 3 is a schematic diagram illustrating coupling of a first sliding rail and a first sliding groove.

A first sliding groove 112 is provided on one of the first inclined surface 111 and the second inclined surface 21, and a first sliding rail 22 is provided on the other of the first inclined surface 111 and the second inclined surface 21 (see FIG. 2 and FIG. 3).

The first sliding rail 22 is slidably mounted along the first sliding groove 112, so that the second inclined surface 21 is slidable with respect to the first inclined surface 111, moving up or down the console intermediate member 2.

Figure 4:
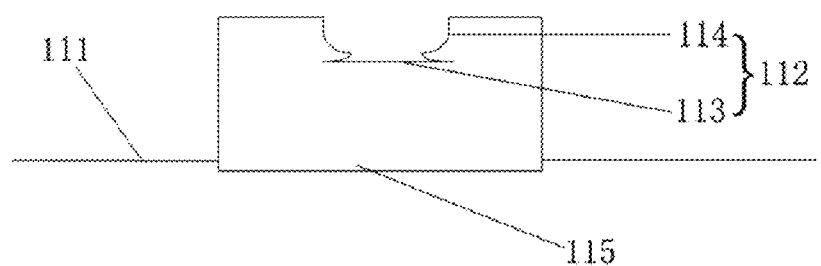
FIG. 4 is a schematic diagram illustrating a structure of a first sliding groove in FIG. 3.

In an exemplary embodiment of the present disclosure, as illustrated in FIG. 2, FIG. 3 and FIG. 4, the first sliding groove 112 is provided on the first inclined surface 111, and the first sliding rail 22 is provided on the second inclined surface 21.

In another exemplary embodiment of the present disclosure, the first sliding groove 112 may be provided on the second inclined surface 21, and the first sliding rail 22 may also be provided on the first inclined surface 111.

The console lower member 1 is formed of a side portion 12 far away from the console intermediate member 2 (see FIG. 1).

In an exemplary embodiment of the present disclosure, as illustrated in FIG. 1, the first inclined surface 111 is formed to gradually approach the side portion 12 of the console lower member 1 in an upward direction thereof.

In another exemplary embodiment of the present disclosure, the first inclined surface 111 may also be formed gradually away from the side portion 12 of the console lower member 1 in a downward direction thereof. Alternatively, the first inclined surface 111 may be provided as a vertical surface.

In the exemplary embodiment of the present disclosure, as illustrated in FIG. 3 and FIG. 4, the first sliding groove 112 includes a first catching groove 113 and a first open groove 114 that communicate with each other. The first open groove 114, compared with the first catching groove 113, is closer to the first sliding rail 22, a width of a portion of the first open groove 114 close to the first catching groove 113 gradually decreases in a direction closer to the first catching groove 113, and a width of a portion of the first catching groove 113 close to the first open groove 114 gradually decreases in a direction closer to the first open groove 114.

Figure 5:
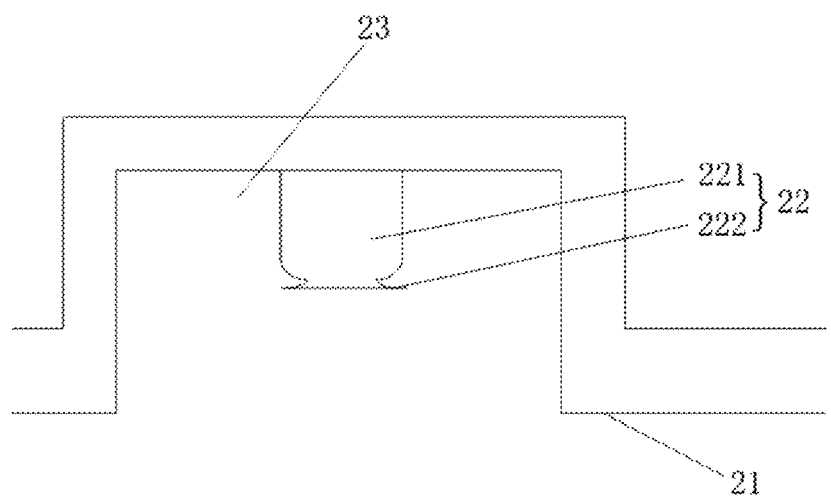
FIG. 5 is a schematic diagram illustrating a structure of a first sliding rail in FIG. 3.
Figure 6:
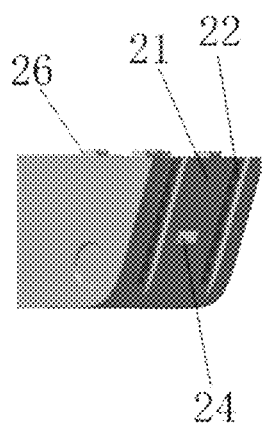
FIG. 6 is a schematic diagram illustrating a structure of a side surface of a console intermediate member.

As illustrated in FIGS. 3 and 5, the first sliding rail 22 includes a first sliding rail body 221 and a first catching connection portion 222 which are integrally formed with each other. The first catching connection portion 222, compared with the first sliding rail body 221, is closer to the first sliding groove 112; a portion of the first sliding rail body 221 close to the first catching connection portion 222 is matched with a cross-sectional shape of the first open groove 114; the first catching connection portion 222 is matched with a cross-sectional shape of the first catching groove 113; and the first catching connection portion 222 is connected to the first catching groove 113 so that the first sliding rail 22 is prevented from being separated from the first sliding groove 112.

In the exemplary embodiment of the present disclosure, as illustrated in FIG. 2, FIG. 3, FIG. 4 and FIG. 5, a first boss 115 is provided on one of the first inclined surface 111 and the second inclined surface 21, and the first sliding groove 112 is provided on the first boss 115. A first concave groove 23 corresponding to the first boss 115 is provided on the other of the first inclined surface 111 and the second inclined surface 21, and the first sliding rail 22 is provided in the first concave groove 23. Accordingly, the first sliding rail 22 of the first concave groove 23 is slidable along the first sliding groove 112 of the first boss 115.

A width of the first concave groove 23 is greater than that of the first boss 115 so that the first concave groove 23 is slidable along the first boss 115 and the first concave groove 23 does not come into contact with the first boss 115.

A minimum value of a difference between the width of the first concave groove 23 and the width of the first boss 115 is 6 mm. That is, a minimum value of a distance between a side wall 231 of the first concave groove 23 and a corresponding side wall 117 of the first boss 115 is 3 mm.

The difference between the width of the first concave groove 23 and the width of the first boss 115 is preferably 10 mm. That is, the distance between the side wall 231 of the first concave groove 23 and the corresponding side wall 117 of the first boss 115 is preferably 5 mm.

In an exemplary embodiment of the present disclosure, as illustrated in FIG. 3, the first boss 115 is provided on the first inclined surface 111, and the first concave groove 23 is provided on the second inclined surface 21.

In another exemplary embodiment of the present disclosure, the first boss 115 may be provided on the second inclined surface 21, and the first concave groove 23 may be provided on the first inclined surface 111.

In the exemplary embodiment of the present disclosure, as illustrated in FIG. 2, two sets of the first boss 115 are provided, and correspondingly, two first concave grooves 23 are provided. Each of the first concave grooves 23 may slide along the corresponding one set of first bosses 115.

In the exemplary embodiment of the present disclosure, as illustrated in FIG. 2, each set is provided with two first bosses 115, and the two first bosses 115 of the same set are positioned on the same straight line.

Correspondingly, two sets of the first sliding grooves 112 are provided, and correspondingly, two first sliding rails 22 are also provided.

Each of the first sliding rails 22 is slidably mounted in the corresponding one set of the first sliding grooves 112.

In the exemplary embodiment illustrated in FIG. 2, two sets of the first sliding grooves 112 are provided, but the number of sets may be adjusted according to circumstances. For example, the number of the sets of the first sliding grooves 112 may be 1 to 4.

As illustrated in FIG. 2, each set is provided with two first sliding grooves 112, and the two first sliding grooves 112 of the same set are located on the same straight line.

In the exemplary embodiment of the present disclosure, as illustrated in FIGS. 1, 2, 6, and 11, a driving device 4 is provided in the console lower member 1. The driving device 4 is provided with an output shaft 41 parallel to the first inclined surface 111, a connecting member 42 extending toward the second inclined surface 21 is provided on the output shaft 41 (see FIG. 11), and an extension groove 116 disposed in a longitudinal direction of the first inclined surface 111 is provided in the first inclined surface 111 (refer to FIG. 2). A connecting groove 24 corresponding to the connecting member 42 is provided on the second inclined surface 21 (see FIG. 6), and the connecting member 42 of the output shaft 41 is inserted into the connecting groove 24 of the console intermediate member 2. The output shaft 41 of the driving device 4 may extend or contract along the extension groove 116 of the first inclined surface 111, so that the connecting member 42 is driven to move along the extending groove 116 of the first inclined surface 111 to move the console intermediate member 2 along the first inclined surface 111 and to fix the console intermediate member 2 at a predetermined position of the first inclined surface 111.

When the console intermediate member 2 reaches a predetermined position of the first inclined surface 111, under control of a relevant control signal, the driving device 4 no longer outputs power and the output shaft 41 is no longer stretched, so that the connecting member 42 does not move and the console intermediate member 2 is fixed at the predetermined position on the first inclined surface 111.

In the exemplary embodiment of the present disclosure, the driving device 4 may be a motor. Here, a type of the driving device 4 is not limited thereto, and as long as the above function may be realized, any type of the related art may be used.

Figure 7:
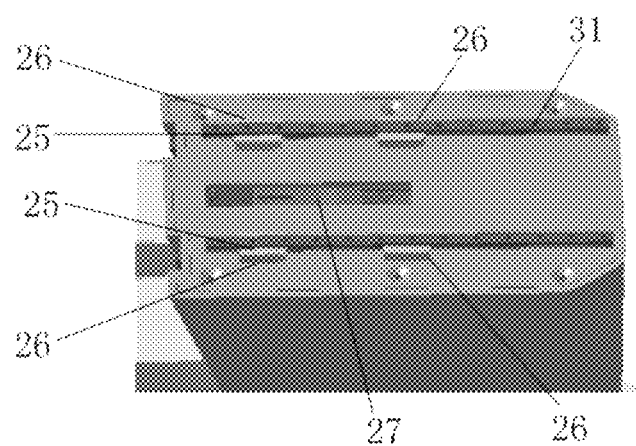
FIG. 7 is a schematic diagram illustrating a structure of an upper portion of a console intermediate member.
Figure 8:
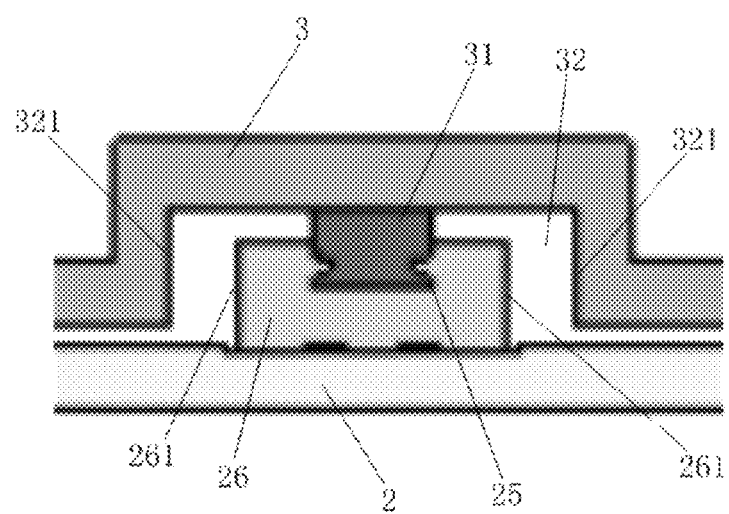
FIG. 8 is a schematic diagram illustrating a coupling of a second sliding rail and a second sliding groove.

In the exemplary embodiment of the present disclosure, as illustrated in FIGS. 1, 7 and 8, the second sliding groove 25 is provided in one of a lower portion of the console upper member 3 and the upper portion of the console intermediate member 2, and a second sliding rail 31 is provided on the other of the lower portion of the console upper member 3 and the upper portion of the console intermediate member 2. The second sliding rail 31 is slidably mounted along the second sliding groove 25 so that the lower portion of the console upper member 3 is slidable relative to the upper portion of the console intermediate member 2.

In the exemplary embodiment of the present disclosure, as illustrated in FIG. 8, the second sliding rail 31 is provided on the lower portion of the console upper member 3, and the second sliding groove 25 is provided on the upper portion of the console intermediate member 2.

In another exemplary embodiment of the present disclosure, the second sliding groove 25 may be provided on the lower portion of the console upper member 3, and the second sliding rail 31 may be provided on the upper portion of the console intermediate member 2.

Figure 9:
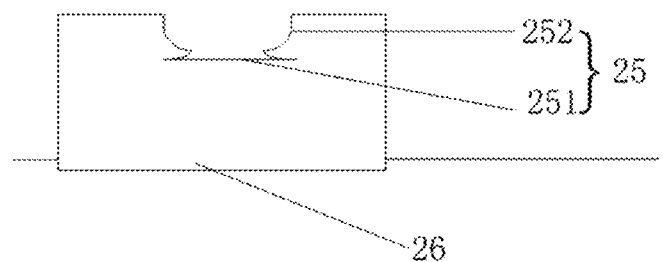
FIG. 9 is a schematic diagram illustrating a structure of a second sliding groove.

In the exemplary embodiment of the present disclosure, as illustrated in FIG. 9, the second sliding groove 25 includes a second catching groove 251 and a second open groove 252 that communicate with each other. The second open groove 252, compared with the second catching groove 251, is closer to the second sliding rail 31 and a width of a portion of the second open groove 252 close to the second catching groove 251 gradually decreases in a direction closer to the second catching groove 251. In addition, the width of the portion of the second caching groove 251 close to the second open groove 252 gradually decreases in a direction closer to the second open groove 252.

Figure 10:
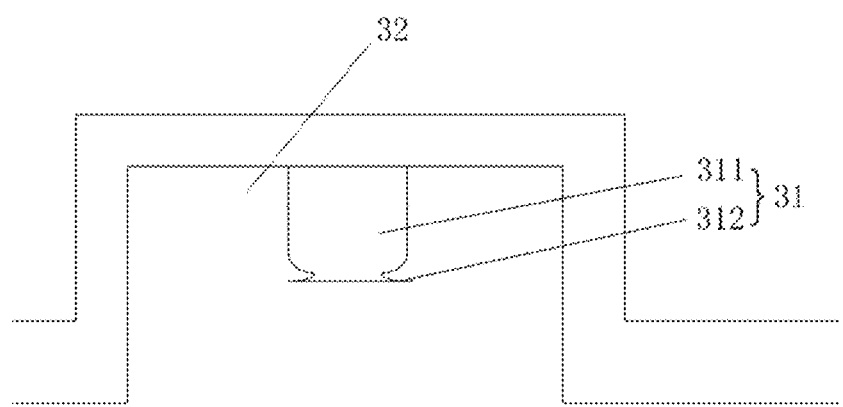
FIG. 10 is a schematic diagram illustrating a structure of the second sliding rail.
Figure 11:
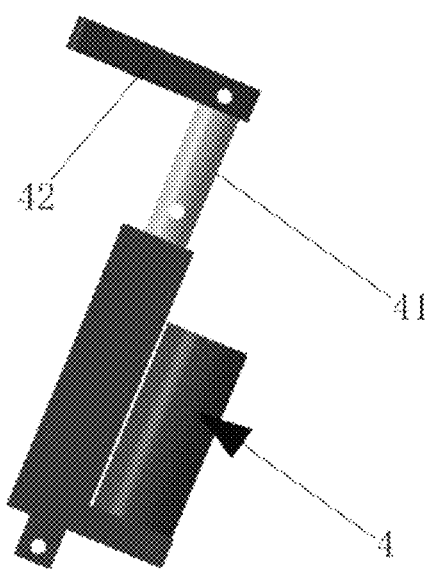
FIG. 11 is a schematic diagram illustrating a structure of a driving device.

As illustrated in FIGS. 8 and 10, the second sliding rail 31 includes a second sliding rail body 311 and a second catching connection portion 312 which are integrally formed with each other. The second catching connection portion 312, compared with the second sliding rail body 311, is closer to the second sliding groove 25, a portion of the second sliding rail body 311 close to the second caching connection portion 312 matches a cross-sectional shape of the second open groove 252, and the second catching connection portion 312 matches a cross-sectional shape of the second catching groove 251. Accordingly, the second catching connection portion 312 is connected to the second catching groove 251 so that the second sliding rail 31 is prevented from being separated from the second sliding groove 25.

In the exemplary embodiment of the present disclosure, as illustrated in FIG. 6, FIG. 7, FIG. 8, FIG. 9 and FIG. 10, a second boss 26 is provided on one of the lower portion of the console upper member 3 and the upper portion of the console intermediate member 2, and the second sliding groove 25 is provided on the second boss 26. A second concave groove 32 corresponding to the second boss 26 is provided on the other of the lower portion of the console upper member 3 and the upper portion of the console intermediate member 2, and the second sliding rail 31 is provided in the second concave groove 32. Accordingly, the second sliding rail 31 of the second concave groove 32 is slidable along the second sliding groove 25 of the second boss 26.

A width of the second concave groove 32 is greater than a width of the second boss 26 so that the second concave groove 32 is slidable along the second boss 26 and the second concave groove 32 does not come into contact with the second boss 26.

A minimum value of a difference between the width of the second concave groove 32 and the width of the second boss 26 is 6 mm. That is, a minimum value of a distance between a side wall 321 of the second concave groove 32 and a corresponding side wall 261 of the second boss 26 is 3 mm.

The difference between the width of the second concave groove 32 and the width of the second boss 26 is preferably 10 mm. That is, the distance between the side wall 321 of the second concave groove 32 and the corresponding side wall 261 of the second boss 26 is preferably 5 mm.

In an exemplary embodiment of the present disclosure, as illustrated in FIG. 8, the second boss 26 is provided on the upper portion of the console intermediate member 2, and the second concave groove 32 is provided on the lower portion of the console upper member 3.

In another exemplary embodiment of the present disclosure, the second boss 26 may be provided on the lower portion of the console upper member 3, and the second concave groove 32 may be provided on the upper portion of the console intermediate member 2.

In the exemplary embodiment of the present disclosure, as illustrated in FIG. 7, two sets of second bosses 26 are provided, and two second concave grooves 32 are provided correspondingly. Each of the second concave grooves 32 is slidable along a corresponding one set of second bosses 26.

In the exemplary embodiment of the present disclosure, as illustrated in FIG. 7, each set is provided with two second bosses 26, and the two second bosses 26 of the same set are positioned on the same straight line.

Correspondingly, two sets of the second sliding groove 25 are provided, and correspondingly, two second sliding rails 31 are provided.

Each of the second sliding rails 31 is slidably mounted in the corresponding one set of the second sliding grooves 25.

In the exemplary embodiment illustrated in FIG. 7, two sets of the second sliding grooves 25 are provided, but the number of sets of the second sliding grooves 25 may be adjusted according to circumstances. For example, the number of the sets of the second sliding groove 25 may be 1 to 4.

As illustrated in FIG. 7, each set is provided with two second sliding grooves 25, and the two second sliding grooves 25 of the same set are located on the same straight line.

In an exemplary embodiment of the present disclosure, a position limiting recess 27 is provided in the upper portion of the console intermediate member 2 (see FIG. 7), and a position limiting block is provided in the lower portion of the console upper member 3. The position limiting block of the console upper member 3 is caught by the position limiting recess 27 of the console intermediate member 2, limiting a range of movement of the console upper member 3.

In another exemplary embodiment of the present disclosure, the position limiting recess 27 is provided in the lower portion of the console upper member 3, and the position limiting block is provided in the upper portion of the console intermediate member 2.

In the exemplary embodiment of the present disclosure, the adjustable console assembly described above may add other functions, such as a cup holder and wireless charging capability, to increase space and convenience.

Various exemplary embodiments of the present disclosure further provides a vehicle provided with the above-described adjustable console assembly.

Hereinafter, the operation of the adjustable console assembly according to the exemplary embodiment of the present disclosure will be described in conjunction with the drawings.

A user controls the output shaft 41 of the driving device 4 to extend or contract through a related control device. Accordingly, the console intermediate member 2 and the console upper member 3 are generally raised or lowered and fixed at a predetermined position, so that a height of the console assembly may be adjusted (see FIG. 12, and FIG. 13).

The user is capable of adjusting a length of the console assembly by manually pushing the console upper member 3 in a forward direction or a rearward direction of the vehicle, causing the console upper member 3 to slide horizontally relative to the console intermediate member 2 (FIG. 12, and FIG. 13).

To better interpret and precisely define the appended claims, terms "top", "bottom", "inside", "outside", "upper surface", "lower surface", "of the upper surface", "of the lower surface", "to the top", "to the bottom", "front", "back", "behind", "inside", "outside", "to the inside", "to the outside", "inner side", "external side", "of the inside", "of the outside", "forward", and "backward" are for describing the features of the exemplary embodiment with reference to the locations of these features illustrated in the drawings.

The above description of specific exemplary embodiments of the present disclosure is for explanation and description. The above description is not intended to be exhaustive or to limit the present disclosure to the precise form disclosed, and obviously, slight modifications and changes are possible in accordance with the teachings above. In order to interpret specific principles of the present disclosure and its practical applications; an exemplary implementation may be selected and described, and through this, others skilled in the art may use and implement various exemplary implementations and various alternative methods and modifications of the present disclosure. The scope of the present disclosure is defined by the appended claims and their equivalents.

While the present disclosure has been described in connection with what is presently considered to be practical exemplary embodiments of the present disclosure, it is to be understood that the present disclosure is not limited to the disclosed exemplary embodiments of the present disclosure. On the contrary, it is intended to cover various modifications and equivalent arrangements included within the spirit and scope of the appended claims.

What is claimed is:

1. An adjustable console assembly, comprising:
    a console lower member fixed to a vehicle and including a receiving portion provided therein;
    a console intermediate member slidably mounted to the receiving portion to move up or move down along the receiving portion of the console lower member; and
    a console upper member horizontally slidably mounted on an upper portion of the console intermediate member,
    wherein the console lower member, the console intermediate member, and the console upper member jointly form an overall appearance of the adjustable console assembly,
    wherein the receiving portion includes a first inclined surface, and the console intermediate member includes a second inclined surface corresponding to the first inclined surface,
    wherein a first sliding groove is provided on one of the first inclined surface and the second inclined surface, and a first sliding rail is provided on another of the first inclined surface and the second inclined surface, and
    wherein the first sliding rail is mounted to be slidable along the first sliding groove, and the second inclined surface is slidable with respect to the first inclined surface to move up or move down the console intermediate member, and
    wherein a first boss is provided on one of the first inclined surface and the second inclined surface, the first sliding groove is provided on the first boss, a first concave groove corresponding to the first boss is provided on another of the first inclined surface and the second inclined surface, and the first sliding rail is provided on the first concave groove, so that the first sliding rail of the first concave groove is slidable along the first sliding groove of the first boss.

2. The adjustable console assembly of claim 1,
    wherein the first sliding groove includes a first catching groove and a first open groove communicating with each other, the first open groove is closer to the first sliding rail than the first catching groove, a width of a portion of the first open groove close to the first catching groove decreases in a direction closer to the first catching groove, and a width of a portion of the first catching groove close to the first open groove decreases in a direction closer to the first open groove, and
    wherein the first sliding rail includes a first sliding rail body and a first catching connection portion connected to each other, the first catching connection portion is closer to the first sliding groove than the first sliding rail body, a portion of the first sliding rail body close to the first catching connection portion matches a cross-sectional shape of the first open groove, the first catching connection portion matches a cross-sectional shape of the first catching groove, and the first catching connection portion is disposed in the first catching groove.

3. The adjustable console assembly of claim 1, wherein a width of the first concave groove is greater than a width of the first boss so that the first concave groove is slidable along the first boss and the first concave groove does not come into contact with the first boss.

4. The adjustable console assembly of claim 1, wherein two sets of first sliding grooves are provided, and correspondingly, two first sliding rails are provided.

5. The adjustable console assembly of claim 2,
    wherein a second sliding groove is provided on one of a lower portion of the console upper member and the upper portion of the console intermediate member,
    wherein a second sliding rail is provided on another of the lower portion of the console upper member and the upper portion of the console intermediate member, and
    wherein the second sliding rail is slidably mounted along the second sliding groove, so that the lower portion of the console upper member is slidable with respect to the upper portion of the console intermediate member.

6. The adjustable console assembly of claim 5,
wherein the second sliding groove includes a second catching groove and a second open groove communicating with each other, the second open groove is closer to the second sliding rail than the second catching groove, a width of a portion of the second open groove close to the second catching groove decreases in a direction closer to the second catching groove, a width of a portion of the second catching groove close to the second open groove decreases in a direction closer to the second open groove, and
wherein the second sliding rail includes a second sliding rail body and a second catching connection portion connected to each other, the second catching connection portion is closer to the second sliding groove than the second sliding rail body, a portion of the second sliding rail body close to the second catching connection portion matches a cross-sectional shape of the second open groove, the second catching connection portion matches a cross-sectional shape of the second catching groove, and the second catching connection portion is disposed in the second catching groove.

7. The adjustable console assembly of claim 5,
wherein a second boss is provided on one of the lower portion of the console upper member and the upper portion of the console intermediate member,
wherein the second sliding groove is provided on the second boss,
wherein a second concave groove corresponding to the second boss is provided on another of the lower portion of the console upper member and the upper portion of the console intermediate member, and
wherein the second sliding rail is provided on the second concave groove, so that the second sliding rail of the second concave groove is slidable along the second sliding groove of the second boss.

8. The adjustable console assembly of claim 7, wherein a width of the second concave groove is greater than a width of the second boss so that the second concave groove is slidable along the second boss, and the second concave groove does not come into contact with the second boss.

9. The adjustable console assembly of claim 5, wherein two sets of second sliding grooves are provided, and correspondingly, two second sliding rails are provided.

10. The adjustable console assembly of claim 1, further including:
a driving device provided in the console lower member and including an output shaft disposed parallel to the first inclined surface; and
a connecting member provided in the output shaft and extending toward the second inclined surface.

11. The adjustable console assembly of claim 10,
wherein an extension groove disposed in a longitudinal direction of the first inclined surface is provided on the first inclined surface,
wherein a connecting groove corresponding to the connecting member is provided on the second inclined surface, and
wherein the connecting member of the output shaft is inserted into the connecting groove of the console intermediate member,
wherein the output shaft of the driving device extends or contracts along the extension groove of the first inclined surface, so that the connecting member is moved along the extension groove of the first inclined surface to move the console intermediate member along the first inclined surface and fixes the console intermediate member at a predetermined position on the first inclined surface.

12. A vehicle comprising the adjustable console assembly of claim 1.

13. An adjustable console assembly, comprising:
a console lower member fixed to a vehicle and including a receiving portion provided therein;
a console intermediate member slidably mounted to the receiving portion to move up or move down along the receiving portion of the console lower member; and
a console upper member horizontally slidably mounted on an upper portion of the console intermediate member,
wherein the console lower member, the console intermediate member, and the console upper member jointly form an overall appearance of the adjustable console assembly,
where the adjustable console assembly further includes:
a position limiting recess provided in the upper portion of the console intermediate member; and
a position limiting block provided in a lower portion of the console upper member,
wherein the position limiting block of the console upper member is caught by the position limiting recess of the console intermediate member, to limit a range of movement of the console upper member.

14. An adjustable console assembly, comprising:
a console lower member fixed to a vehicle and including a receiving portion provided therein;
a console intermediate member slidably mounted to the receiving portion to move up or move down along the receiving portion of the console lower member; and
a console upper member horizontally slidably mounted on an upper portion of the console intermediate member,
wherein the console lower member, the console intermediate member, and the console upper member jointly form an overall appearance of the adjustable console assembly,
where the adjustable console assembly further includes:
a position limiting recess provided in a lower portion of the console upper member; and
a position limiting block provided in the upper portion of the console intermediate member,
wherein the position limiting block of the console upper member is caught by the position limiting recess of the console intermediate member, to limit a range of movement of the console upper member.

* * * * *